United States Patent [19]

Zahid

[11] 4,291,726

[45] Sep. 29, 1981

[54] ACCUMULATOR DEVICE HAVING SAFETY CHARGING PORT

[75] Inventor: Abduz Zahid, Los Angeles, Calif.

[73] Assignee: Greer Hydraulics, Incorporated, Chatsworth, Calif.

[21] Appl. No.: 93,042

[22] Filed: Nov. 13, 1979

[51] Int. Cl.[3] .................... F16L 55/04

[52] U.S. Cl. .................... 138/30; 220/85 B; 220/241

[58] Field of Search .................... 138/26, 30; 220/85 B, 220/233, 234, 241

[56] References Cited

U.S. PATENT DOCUMENTS

| | | | |
|---|---|---|---|
| 2,371,633 | 3/1945 | Lippincott | 138/30 |
| 3,379,215 | 4/1968 | Greer et al. | 138/30 |
| 3,960,179 | 6/1976 | Zahid | 138/30 |
| 3,961,646 | 6/1976 | Schön | 138/30 |

*Primary Examiner*—James E. Bryant, III

*Attorney, Agent, or Firm*—Arthur B. Colvin

[57] ABSTRACT

The present invention is directed to an accumulator device of the type which includes a pressure vessel having an oil port at one end, a bladder dividing the vessel into two chambers, a removable cap member at the other end retaining the bladder in position, the cap member including a gas charging valve assembly. The apparatus is characterized by a safety feature whereby the cap member may not be removed without first having removed the gas charging valve assembly, whereby it is assured that the gas pressure within the gas chamber will have previously been vented.

2 Claims, 4 Drawing Figures

ACCUMULATOR DEVICE HAVING SAFETY CHARGING PORT

BACKGROUND OF THE INVENTION

1. Field of the Invention

The present invention is in the field of accumulator devices and is directed more specifically to a hydraulic accumulator device of the type in which the gas charging port assembly is mounted in a removable cap member disposed at one end of the pressure vessel.

2. The Prior Art

It is conventional to provide a hydraulic accumulator device for purposes of energy storage and/or for pulsation dampening, which device is comprised of a pressure vessel divided into two chambers by an expansible bladder assembly. One of the chambers is connected to hydraulic fluid under pressure via an oil port formed in the pressure vessel. The other chamber is charged with gas under great pressure through a gas charging valve assembly in communication with the other chamber.

In certain devices of the type described, it is desirable to provide a bladder assembly which may be readily replaced in the event of rupture thereof. To effect such facile replacement, the gas charging valve assembly is mounted in a removable cap threadedly connected to the pressure vessel whereby, upon unthreading, access is provided to the bladder. In the event that the cap member is unthreaded before all of the pressure has been vented from the gas chamber, there is considerable danger that the cap member will be propelled at high velocity from the end of the pressure vessel, with consequent great likelihood of injury.

SUMMARY OF THE INVENTION

The present invention may be summarized as directed to an accumulator of the type described and including an oil charging port at one end, a threadedly mounted cap member at the other end carrying a gas charging valve assembly, and a bladder interposed between the ends of the vessel and dividing the same into two chambers.

Means are provided in the nature of a spanner wrench tool which operates a retainer nut holding the end cap assembly in position.

The device includes blocking means mounted on the gas charging valve assembly, which blocking means prevents insertion of the spanner wrench tool into the gas retainer nut, whereby the nut cannot be loosened and the cap removed unless the gas charging valve assembly and blocking means have been previously removed.

Loosening of the gas charging valve assembly prior to removal results in a venting of the pressure, and hence there is no danger that such removal will result in injury.

Accordingly, it is an object of the invention to provide an accumulator device having a replaceable bladder which is characterized in that the cap member providing access to the bladder cannot be inadvertently removed without prior venting of pressure from the gas chamber.

A further object of the invention is the provision of an accumulator assembly of the type described wherein the gas charging valve assembly is mounted on a removable end cap retained in position on the vessel by a retainer nut having socket means adapted to be engaged by a removing tool, such as a spanner wrench, the device being characterized by the gas charging valve assembly including locking means preventing coupling of the tool and the socket means unless and until the gas charging valve assembly has been removed, with consequent venting of gas pressure.

To attain these objects and such further objects as may appear herein or be hereinafter pointed out, reference is made to the accompanying drawings, forming a part hereof, in which.

Figure 1:
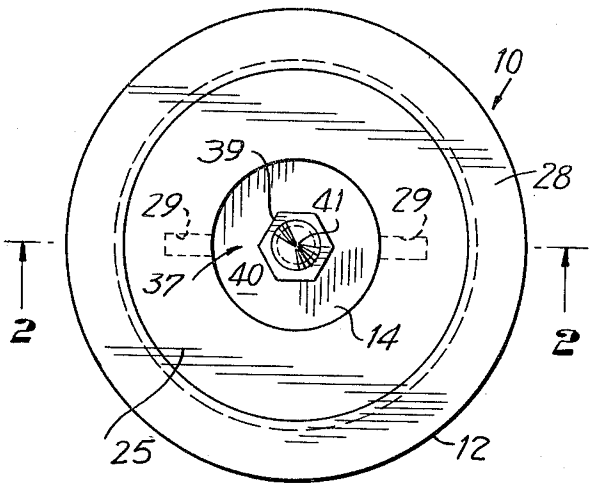
FIG. 1 is a top plan view of an accumulator assembly in accordance with the invention.
Figure 2:
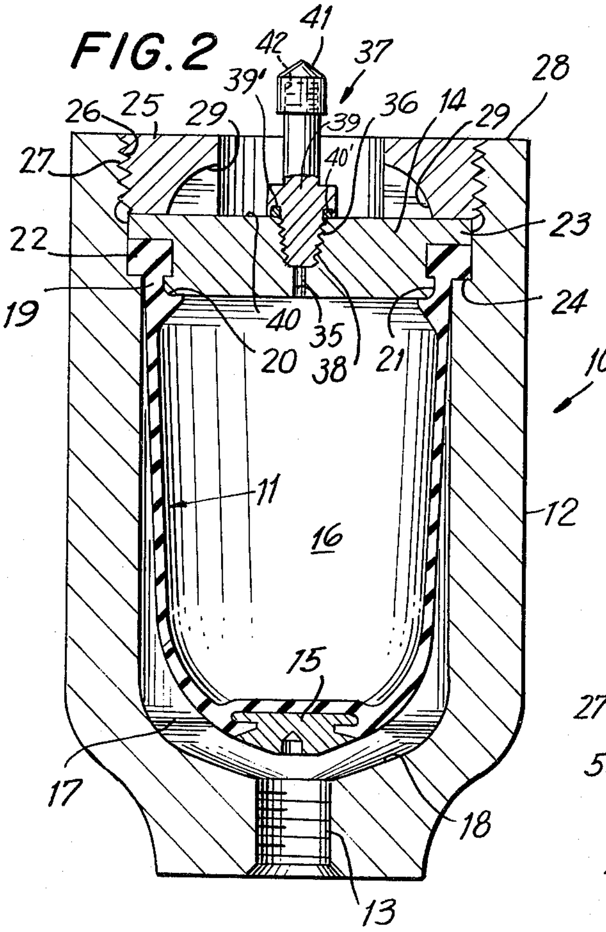
FIG. 2 is a vertical section taken on line 2—2 of FIG. 1.

Turning now to the drawings, there is shown in FIGS. 1 and 2 an accumulator device 10 having a replaceable bladder assembly 11. Unlike many accumulator devices wherein the pressure vessel components are welded together and hence, upon rupture of the bladder, the assembly is rendered permanently useless and must be replaced, the accumulator device of the present invention is of the bladder replaceable type wherein a bladder assembly, such as the assembly 11, may be removed and replaced.

The device includes a pressure vessel 12 having an oil port 13 at its lower end. The bladder assembly is mounted on an end cap 14. The bladder 11 may include at its lower end a rigid valve member 15 which, when the pressure in the gas chamber 16 exceeds the pressure in the oil chamber 17, is seated on the beveled portion 18 defining a valve seat.

The upper end of the bladder assembly 11 includes a thickened rim portion 19 having an annular, inwardly directed undercut 20. The undercut portion 20 receives and/or is bonded to a radially projecting flange 21 forming a part of cap assembly 14.

The thickened rim portion 19 of the bladder assembly 11 may be bonded to or molded insitu over the cap portion 14, as is known per se. The thickened upper portion 19 of the bladder assembly may include an integral annular gasket portion 22.

The cap member may include an upper projecting flange 23 overlying the gasket portion 22 whereby, in the mounted position of the cap member on the pressure vessel, the gasket portion 22 is compressed between flange 23 and an upwardly directed ledge 24 forming a part of the pressure vessel.

With this construction it will be observed that when the cap member is forced downwardly, the gasket 22 is subjected to axial compressive forces and concomitantly is caused to expand in a radial direction, providing a double sealing effect.

The cap member 14 is positioned and maintained by a retainer nut member 25. The retainer nut member is externally threaded as at 26, the external thread mating with a complemental internally threaded portion 27 at the upper end 28 of the pressure vessel. Preferably, as best seen in FIG. 2, the retainer nut 25 is disposed entirely within a recess formed at the upper end 28 of the pressure vessel.

Figure 3:
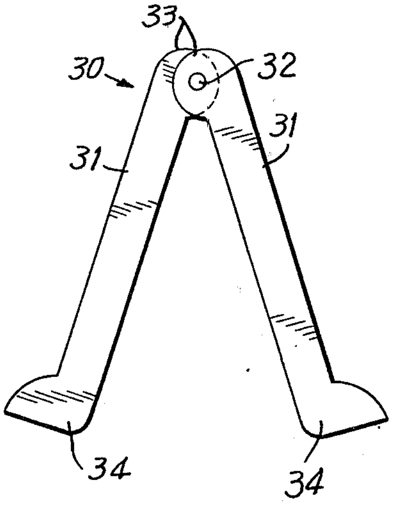
FIG. 3 is a side elevational view of a removing tool for use with the device of FIGS. 1 and 2.

The retainer nut 25 includes an opposed pair of socket portions 29, 29 forming receivers or anchor points for an insertion and removal tool 30, illustrated in FIG. 3.

The removal tool 30 comprises a pair of leg portions 31, 31, pivotally connected by a pin 32 at their upper end portions 33, 33. The tool includes a pair of driver feet 34, 34, at the distal ends of the legs 31, 31, the configuration of the feet 34, 34 being such as to be readily received within the sockets 29, 29 of the retainer nut. When thus received within the sockets, it will be evident that torsional forces applied to the tool, as would be necessary for either a seating of the nut or for a removal of the nut, exerted against the tool will be transmitted to the retainer nut.

Figure 4:
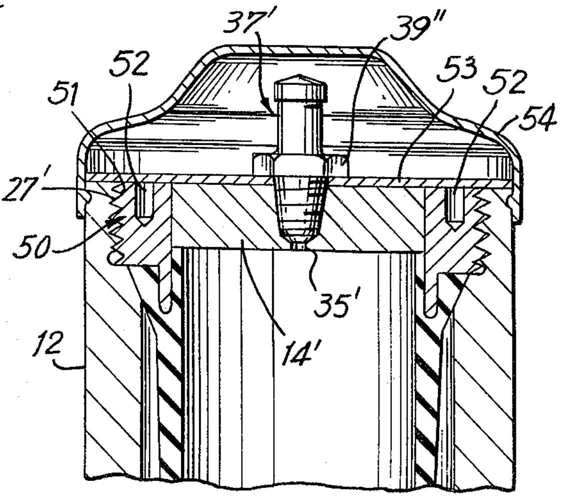
FIG. 4 is a fragmentary vertical sectional view of an accumulator in accordance with a further embodiment of the invention.

The cap member 14 includes a gas charging passage 35 leading to an enlarged tapered bore 36 which is internally threaded, as shown in FIGS. 2 and 4.

The gas charging valve assembly 37 includes an externally threaded stem portion 38 received within threaded bore 36. A lock nut configuration 39 is formed integral with stem 38 and, in the inserted position of the valve assembly 37, the undersurface of the nut 39 bears against the upper surface 40 of the cap member surrounding the bore 36. As shown in FIG. 2, such undersurface has an annular groove 39′ in which an "O" ring 40′ is positioned so that when the stem portion is tightened, the "O" ring 40′ will be forced against surface 40 to form a gas tight seal in addition to the metal to metal seal between stem 38 and tapered bore 36.

The valve assembly 37, which is of the one-way type, may include a shield or stopper portion 41 threadedly mounted over outer end portion 42 of the valve stem.

The accumulator device, in its functional or operative position, is illustrated in FIG. 2, the bladder member 11 being charged with gas under pressure. Should it be desired to remove the bladder assembly, it is evident that the cap member 14 must first be removed and that removal of such cap member can be effected only by removal of the retainer nut 25. However, as will be readily recognized by an inspection of FIGS. 2 and 3, by virtue of the presence of the nut configuration 39, the clearances between adjacent portions of the retainer nut 35 and the valve assembly are such as to preclude the insertion of the feet 34 of the tool 30 into the receiver sockets 29 of the cap member. It is only after the valve assembly 37 has been removed from the bore 36 that the tool 30 can be positioned in torque transmitting relation to the nut 25.

It is thus evident that by accomplishing the prior removal of the valve assembly 37 which, when the stem 38 is initially loosened, will break the metal to metal seal between stem 38 and bore 36 due to the tapered configurations thereof, while still providing sufficient engaging thread configurations to prevent release of the stem, and also will break the sealing action of "O" ring 40′, there is assured a venting of the gas pressure from chamber 16 before the retainer nut 25 and cap assembly 14 may be demounted from the pressure vessel. Otherwise put, the gas charging valve assembly which, in assembling of the pressure vessel will be the last of the components to be positioned, incorporates one or more parts which block access to the torque transmitting means or sockets formed in the retainer nut and thus preclude the effective transmission of torque to the nut until after the gas charging valve has been demounted.

In the embodiment of FIG. 4 wherein like parts have been given like reference numerals, the cap member 14′ is mounted in position in the upper end of the pressure vessel 12 by a retainer nut assembly 50 having an external thread 51 mating with threaded portion 27′ of the pressure vessel. The nut and cap 14′ are connected by welding.

In the device of this embodiment, the retainer nut 51 is provided with two or more upwardly directed blind holes or sockets 52, 52 which provide anchoring points for a conventional spanner wrench. In this instance, access to the torque receiving sockets 52, 52 is prevented by a shield disk 53 which overlies the sockets 52, 52. The shield disk 53 is maintained in position by the lock nut 39″ of the gas charging valve assembly 37′. The device may be covered by a dust shield dome 54, which may be comprised of polymeric material, snapped over the end of the pressure vessel.

In the embodiment of FIG. 4, in order to effect removal of the cap assembly 14′, it is first necessary to remove the dust shield dome 54. Thereafter, the gas charging valve assembly is exposed and may be removed by unthreading, whereupon pressure in the gas chamber 16 will be vented through the reduced size passage 35′. Only after the gas charging valve assembly 37′ has been removed can the shield disk 53 be removed, providing access to the sockets 52, 52 for the reception of a spanner wrench.

From the foregoing description it will be readily recognized that there are shown two preferred embodiments of a pressure accumulator device characterized in that removal of the bladder assembly can be effected only after the gas charging valve has been demounted, with resultant safe venting of the gas pressure.

It will be appreciated by those familiarized with the instant disclosure that numerous mechanical variations may be made in the specific embodiments illustrated without departing from the spirit of the instant invention, which is intended to be directed broadly, within the scope of the appended claims, to the concept of providing an accumulator device, the gas charging end portion of which can be removed only after the gas charging valve assembly has been removed or disassembled at least to a degree sufficient to assure venting of the gas in the chamber.

Having thus described the invention and illustrated its use, what is claimed as new and is desired to be secured by Letters Patent is:

1. A hydraulic accumulator device comprising, in combination, a pressure vessel having an oil port at one end and having an open mouth portion at the other end, an internal retainer thread portion formed in surrounding relation of said open mouth portion, a cap member seated in sealing relation of said open mouth portion, said cap member including a threaded gas charging port, a gas charging valve assembly threadedly engaged in said gas charging port, a bladder assembly mounted in said vessel and dividing the same into two chambers in communication, respectively, with said oil and said gas ports, an annular retainer nut member having an external threaded portion threadedly engaged with said retainer thread and including stop portions overlapping said cap member and clamping said cap member against movement axially outwardly of said mouth portion, socket means on said retainer nut member accessible through said open mouth portion, driver tool means adapted to be engaged with said socket means for providing a driving connection between said retainer nut member and said tool means to permit threading and unthreading of said nut from said retainer thread, and blocking means secured to said cap assembly by said gas charging valve assembly interposed between said tool means and said socket means for blocking access of said tool means to said socket means while said gas charging valve assembly is positioned in said gas port, whereby said valve assembly must be removed as a condition precedent to engagement of said tool and socket.

2. A device in accordance with claim 1 in which said gas charging port and said gas charging valve assembly are correspondingly tapered.

* * * * *